US012802543B2

(12) United States Patent
Ghyme

(10) Patent No.: US 12,802,543 B2
(45) Date of Patent: Nov. 17, 2026

(54) SYSTEM AND METHOD FOR DETECTING OCCURRENCE OF FIRE AND APPARATUS FOR THE SAME

(71) Applicant: ELECTRONICS AND TELECOMMUNICATIONS RESEARCH INSTITUTE, Daejeon (KR)

(72) Inventor: Sang Won Ghyme, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 18/989,334

(22) Filed: Dec. 20, 2024

(65) Prior Publication Data

US 2025/0232656 A1 Jul. 17, 2025

(30) Foreign Application Priority Data

Jan. 15, 2024 (KR) ........................ 10-2024-0005897

(51) Int. Cl.

*G08B 17/06* (2006.01)
*G06N 20/00* (2019.01)
*H04W 4/90* (2018.01)

(52) U.S. Cl.

CPC ............ *G08B 17/06* (2013.01); *G06N 20/00* (2019.01); *H04W 4/90* (2018.02)

(58) Field of Classification Search

CPC ...... G08B 17/06; G08B 17/005; G08B 17/12; G08B 29/186; G08B 31/00; G08B 17/00; G08B 25/00; G06N 20/00; G06N 5/04; H04W 4/90

See application file for complete search history.

(56) References Cited

U.S. PATENT DOCUMENTS

| | | | | |
|---|---|---|---|---|
| 8,467,327 B2 | 6/2013 | Hong et al. | | |
| 11,304,186 B2 | 4/2022 | Cheong et al. | | |
| 11,688,263 B2 | 6/2023 | Shin et al. | | |
| 2010/0315991 A1* | 12/2010 | Nawata | H04W 60/04 | 370/315 |
| 2010/0317317 A1* | 12/2010 | Maier | H04W 4/029 | 455/404.2 |

(Continued)

FOREIGN PATENT DOCUMENTS

| | | |
|---|---|---|
| JP | 2880315 B2 | 4/1999 |
| KR | 10-2040026 B1 | 11/2019 |

(Continued)

*Primary Examiner* — Amine Benlagsir

(74) *Attorney, Agent, or Firm* — Sughrue Mion, PLLC

(57) ABSTRACT

The present invention relates to a system and method for detecting fire occurrence, and a device therefor. A method for detecting occurrence of a fire according to one aspect of the present invention may include: periodically receiving a wireless signal from a second device; deriving an amplitude value and a phase value for the wireless signal from the wireless signal; detecting whether a fire has occurred and a location of the fire by performing inference of an artificial intelligence model using the amplitude value and the phase value as input data; and notifying an external system when it is detected that the fire has occurred at a specific location.

13 Claims, 4 Drawing Sheets

(56) References Cited

U.S. PATENT DOCUMENTS

| | | | | |
|---|---|---|---|---|
| 2011/0235560 | A1* | 9/2011 | Kurita | H04W 56/0035 370/311 |
| 2018/0025618 | A1* | 1/2018 | Rutter | G08B 25/14 340/517 |
| 2019/0378392 | A1* | 12/2019 | Chuang | G08B 25/016 |
| 2021/0089040 | A1* | 3/2021 | Ebrahimi Afrouzi | G05D 1/0248 |
| 2022/0005337 | A1 | 1/2022 | Shin et al. | |
| 2023/0384113 | A1* | 11/2023 | Nayak | G01C 21/3893 |
| 2024/0133936 | A1* | 4/2024 | Cook | G01R 31/08 |

FOREIGN PATENT DOCUMENTS

| | | | |
|---|---|---|---|
| KR | 10-2079805 | B1 | 2/2020 |
| KR | 10-2021-0094931 | A | 7/2021 |
| KR | 1020230062716 | A | 5/2023 |

* cited by examiner

SYSTEM AND METHOD FOR DETECTING OCCURRENCE OF FIRE AND APPARATUS FOR THE SAME

CROSS-REFERENCE TO RELATED APPLICATIONS

This application claims the benefit of earlier filing date and right of priority to Korean Application No. 10-2024-0005897, filed on Jan. 15, 2024, the contents of which are all hereby incorporated by reference herein in their entirety.

TECHNICAL FIELD

The present invention relates to a method for detecting the occurrence of a fire, and more specifically, to a system and method for detecting the occurrence of a fire by inferring a pre-learned artificial intelligence model using channel state information for a received wireless signal, and a device therefor.

BACKGROUND

Technology is required to effectively monitor and detect fires/forest fires in complex and wide areas and to immediately report them. Methods for detecting fires/forest fires are mainly divided into methods using physical sensors and methods for monitoring images captured by cameras.

The method using physical sensors has many related sensors that have been commercialized and widely used, but has the disadvantage of requiring dense installation of many sensors and high costs.

The method of monitoring through camera images can monitor a wide area with one camera, but since the monitoring must be performed directly by a person, it is difficult to monitor 24 hours a day and smooth monitoring is difficult due to the fatigue of the monitor. The camera-based fire/forest fire monitoring method is operated by installing additional cameras in the existing fire/forest fire monitoring ellipse. However, if the terrain is complex and wide, it is difficult to monitor the entire area with several camera towers. In addition, there is a high possibility of false detection due to various natural phenomena such as clouds or fog, and there are various problems such as difficulty in identifying smoke with a camera in the evening when the sun has set.

SUMMARY

A technical object of the present disclosure is to provide a method for detecting the occurrence of a fire by inferring a pre-learned artificial intelligence model using channel state information for a wireless signal.

The technical objects to be achieved by the present disclosure are not limited to the above-described technical objects, and other technical objects which are not described herein will be clearly understood by those skilled in the pertinent art from the following description.

A method for detecting occurrence of a fire according to one aspect of the present disclosure may include: periodically receiving a wireless signal from a second device; deriving an amplitude value and a phase value for the wireless signal from the wireless signal; detecting whether a fire has occurred and a location of the fire by performing inference of an artificial intelligence model using the amplitude value and the phase value as input data; and notifying an external system when it is detected that the fire has occurred at a specific location.

A first device for detecting occurrence of a fire according to an additional aspect of the present disclosure may include: at least one processor; and at least one memory operably connected to the at least one processor and storing instructions that, when executed by the one or more processors, cause the first device to perform operations. The operations may include: periodically receiving a wireless signal from a second device; deriving an amplitude value and a phase value for the wireless signal from the wireless signal; detecting whether a fire has occurred and a location of the fire by performing inference of an artificial intelligence model using the amplitude value and the phase value as input data; and notifying an external system when it is detected that the fire has occurred at a specific location.

At least one non-transitory computer-readable medium storing at least one instruction according to an additional aspect of the present invention, wherein the at least one instruction executable by at least one processor may control a first device for detecting occurrence of a fire to: periodically receive a wireless signal from a second device; derive an amplitude value and a phase value for the wireless signal from the wireless signal; detect whether a fire has occurred and a location of the fire by performing inference of an artificial intelligence model using the amplitude value and the phase value as input data; and notify an external system when it is detected that the fire has occurred at a specific location.

Preferably, a plurality of feature maps may be generated for a plurality of wireless signals in a time domain transmitted from the second device, each feature map for the plurality of feature maps may be generated by combining an amplitude value vector composed of subcarrier-specific and packet-specific amplitude values of each wireless signal for the plurality of wireless signals and a phase value vector composed of subcarrier-specific and packet-specific phase values of each wireless signal for the plurality of wireless signals, and whether the fire has occurred and the location of the fire are detected based on the feature maps.

Preferably, a multidimensional tile map composed of tiles having a predetermined size for each dimension may be generated between the second device and the first device, and the specific location where the fire has occurred may be determined based on coordinates of the tiles.

Preferably, the artificial intelligence model may be learned using the plurality of feature maps and the multidimensional tile map.

Preferably, when there is an overlapping tile in multiple multidimensional type maps for multiple second devices, whether a fire has occurred in the overlapping tile may be detected based on all of the inferences of the artificial intelligence models to the multiple corresponding multidimensional tile maps.

Preferably, when it is detected that the fire has occurred for a predetermined period of time or more and/or when it is detected that the fire has occurred at the specific location for a predetermined number of times or more, it may be notified to the external system.

According to an embodiment of the present invention, effective fire/forest fire occurrence monitoring can be provided by utilizing wireless signals.

In addition, according to an embodiment of the present invention, automatic fire/forest fire occurrence monitoring can be performed 24 hours a day in real time regardless of weather changes and day/night changes in an area of several kilometers (Km).

In addition, according to an embodiment of the present invention, there is no privacy invasion problem due to detection of fire/forest fire occurrence.

In addition, according to an embodiment of the present invention, when implemented on a mountain for detection of forest fire occurrence, forest fire monitoring is possible for the entire area of the mountain without any blind spots.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
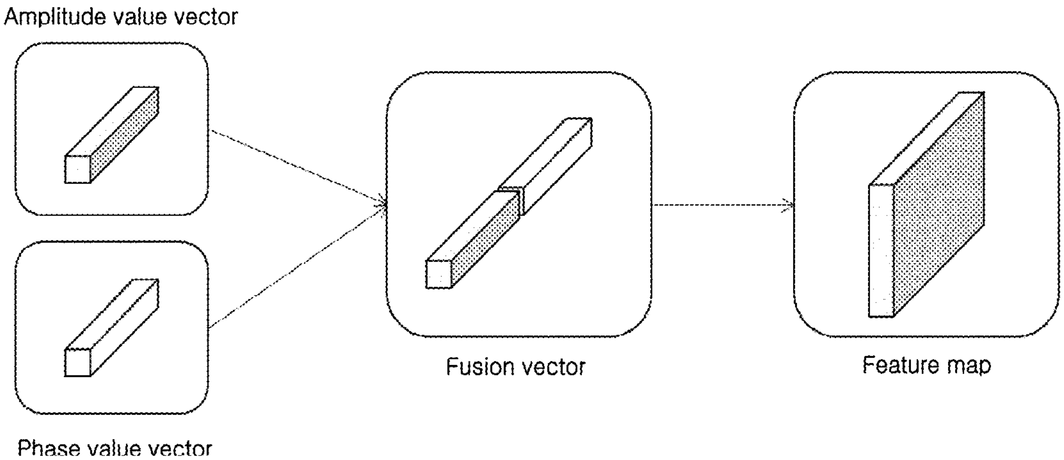
FIG. 1 is a diagram illustrating a process of generating a feature map from channel state information according to one embodiment of the present invention.

Since the present disclosure can make various changes and have various embodiments, specific embodiments will be illustrated in the drawings and described in detail in the detailed description. However, this is not intended to limit the present disclosure to specific embodiments, and should be understood to include all changes, equivalents, and substitutes included in the feature and technical scope of the present disclosure. Similar reference numbers in the drawings refer to identical or similar functions across various aspects. The shapes and sizes of elements in the drawings may be exaggerated for clearer explanation. For a detailed description of the exemplary embodiments described below, refer to the accompanying drawings, which illustrate specific embodiments by way of example. These embodiments are described in sufficient detail to enable those skilled in the art to practice the embodiments. It should be understood that the various embodiments are different from one another but are not necessarily mutually exclusive. For example, specific shapes, structures and characteristics described herein with respect to one embodiment may be implemented in other embodiments without departing from the spirit and scope of the disclosure. Additionally, it should be understood that the position or arrangement of individual components within each disclosed embodiment may be changed without departing from the spirit and scope of the embodiment. Accordingly, the detailed description that follows is not to be intended in a limiting sense, and the scope of the exemplary embodiments is limited only by the appended claims, together with all equivalents to what those claims assert if properly described.

In the present disclosure, terms such as first, second, etc. may be used to describe various components, but the components should not be limited by the terms. The above terms are used only for the purpose of distinguishing one component from another. For example, a first component may be referred to as a second component, and similarly, the second component may be referred to as a first component without departing from the scope of the present disclosure. The term "and/or" includes any of a plurality of related stated items or a combination of a plurality of related stated items.

When a component of the present disclosure is referred to as being "connected" or "accessed" to another component, it may be directly connected or connected to the other component, but other components may exist in between. It must be understood that it may be possible. On the other hand, when it is mentioned that component is "directly connected" or "directly accessed" to another component, it should be understood that there are no other components in between.

The components appearing in the embodiments of the present disclosure are shown independently to represent different characteristic functions, and do not mean that each component is comprised of separate hardware or one software component. That is, each component is listed and included as a separate component for convenience of explanation, and at least two of each component can be combined to form one component, or one component can be divided into a plurality of components to perform a function, and each of these components can be divided into a plurality of components. Integrated embodiments and separate embodiments of the constituent parts are also included in the scope of the present disclosure as long as they do not deviate from the essence of the present disclosure.

The terms used in this disclosure are only used to describe specific embodiments and are not intended to limit the disclosure. Singular expressions include plural expressions unless the context clearly dictates otherwise. In the present disclosure, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. In other words, the description of "including" a specific configuration in this disclosure does not exclude configurations other than the configuration, and means that additional configurations may be included in the scope of the implementation of the disclosure or the technical feature of the disclosure.

Some of the components of the present disclosure may not be essential components that perform essential functions in the present disclosure, but may simply be optional components to improve performance. The present disclosure can be implemented by including only essential components for implementing the essence of the present disclosure, excluding components used only to improve performance, and a structure that includes only essential components excluding optional components used only to improve performance is also included in the scope of rights of this disclosure.

Hereinafter, embodiments of the present disclosure will be described in detail with reference to the drawings. In describing the embodiments of the present specification, if it is determined that a detailed description of a related known configuration or function may obscure the gist of the present specification, the detailed description will be omitted, and the same reference numerals will be used for the same components in the drawings. Redundant descriptions of the same components are omitted.

Hereinafter, the present invention proposes a method and system for quickly and accurately monitoring fire/forest fires using WiFi signals.

Specifically, the present invention proposes a fire/forest fire detection technology that utilizes wireless local area network (WLAN) (known as WiFi) signals based on machine learning (ML) for fire/forest fire monitoring. In other words, the present invention learns in advance channel state information data of wireless LAN signals received by receivers located in various locations for wireless LAN signals transmitted from transmitters. A fire/forest fire detection method and system that can detect fire or forest fire by classifying it through an artificial intelligence (AI) model (e.g., neural network) are proposed.

In the present disclosure, for the convenience of explanation, the present invention is described mainly by exemplifying a wireless LAN signal, but the present invention is not limited thereto, and various wireless signals such as a cellular signal may be used.

In addition, for example, the wireless LAN signal is not limited to the wireless signal in the 2.4 GHz, 5 GHz band defined by standards such as IEEE 802.11 b/a/g/n/ac/ax/be, and can be used to encompass wireless signals in various bands including 1.8 GHz, 2.3 GHz defined by cellular systems (e.g., LTE (long term evolution), 5G (5th generation).

The method of detecting fire/forest fire using a wireless signal (e.g., wireless LAN signal, cellular signal) of the present invention specifically analyzes the channel state information (CSI) of the wireless signal to detect the occurrence of fire/forest fire and identify the location of the fire/forest fire.

In general, wireless communication transmits data by loading it onto a channel. Here, various technologies are used to transmit data at high speed and with good quality.

First, by using OFDM (Orthogonal Frequency Division Multiplexing) technology, it is possible to transmit/receive a larger number of data in parallel using multiple sub-channels, and this has been adopted in, for example, the IEEE 802.11a/g/n/ac standards.

Second, by using MIMO (Multi-Input Multi-Output) technology, the receiver can receive wireless signals transmitted through various paths (multi-path) with multiple antennas and restore them to the original signal through a computational process to improve reception quality, and has been adopted in the IEEE 802.11n/ac standard.

The channel state information of the wireless LAN signal can be expressed as Equation 1 below.

$$Y_i = H_i \times X_i + M_i,\ i \in \{1, \ldots, S\} \quad \text{[Equation 1]}$$

In Equation 1, $X_i$, $Y_i$, $H_i$, and $M_i$ all mean signal information for the i-th subcarrier. $X_i$ is composed of a vector of the dimension of the number of transmitting antennas ($N_t$), $Y_i$ is composed of a vector of the dimension of the number of receiving antennas ($N_r$), and $H_i$ is a matrix that signifies the channel state change of the received signal with respect to the transmitted signal. It consists of ($N_t$×$N_r$), and $M_i$ is composed of a noise vector of ($N_r$) dimensions.

$X_i$ and $Y_i$ are composed through the transmission and reception process of wireless LAN signals, and $H_i$ and $M_i$ can be calculated from the Equation 1. When collecting a lot of subcarrier data in various environments, it is important to calculate more accurately because the influence of environmental noise is significant. For this purpose, for example, the wavelet domain denoising method can be used, and in this case, after the wireless signal is decomposed by the wavelet, the noise with the wavelet below the threshold value can be distinguished by utilizing the fact that the wavelet coefficient of the noise is small.

Additionally, channel state information H can be easily extracted and used by the 802.11n CSI gathering tool provided for the wireless LAN NIC.

The individual channel state information h that constitutes the channel state information $H_i$ for each subcarrier can be given in the form of a complex number in the orthogonal coordinate system, and this can be converted to the complex number form of the polar coordinate system to obtain the value of the amplitude (r) and phase (θ) as in the Equation 2 below.

$$h = a + bi = r(\cos\theta + i\sin\theta) = re^{i\theta} \quad \text{[Equation 2]}$$

$$r = \sqrt{a^2 + b^2},\ \theta = \arctan(b/a)$$

The number of channel state information $H_i$ is determined from the number of used subcarriers. In addition, when packet data are transmitted from a wireless LAN transmitter to a wireless LAN receiver in time order, channel state information for each packet can be collected. If the number of subcarriers is S and T packets are transmitted, S×T channel state information can be obtained. Here, the total number of individual channel state information h for each subcarrier is $S \times T \times N_t \times N_r$.

As electromagnetic signals are transmitted between a wireless LAN transmitter and receiver, they undergo scattering and diffraction, causing changes in the amplitude and phase of each subcarrier. This change in subcarrier channel state information can be said to express the characteristics of the space through which the signal is transmitted.

The characteristics of the space that can be expressed by the change in subcarrier channel state information include the movement and posture changes of people, humidity changes, and temperature changes, etc.

Since channel state information values representing the characteristics of space are not expressed in an easy-to-understand form, they have been used only for very limited purposes such as radar. However, with the recent development of machine learning technology, it has become possible to classify patterns of channel state information values.

The amplitude and phase values extracted from the channel state information values include various noises and distorted forms. In the past, the channel state information was used by strongly removing noise from the amplitude and phase values and converting them into a form that is easy to analyze. On the other hand, this noise removal can have the adverse effect of removing small clues. Time lag occurs due to the lack of time synchronization between the transmitter(s) and receiver(s) in the phase value, and it is necessary to apply a correction (linear fitting) to eliminate this effect.

FIG. 1 is a diagram illustrating a process of generating a feature map from channel state information according to one embodiment of the present invention.

Referring to FIG. 1, the corrected amplitude and phase values of $S \times T \times N_t \times N_r$ are each converted into vector forms, and then the two vectors are fused and converted into a feature map.

In other words, when a wireless signal consisting of S subcarriers and T packets is transmitted from a transmitter having $N_t$ transmit antennas to a receiver having $N_r$ receive antennas, the fire detection system according to the present invention can generate a first vector consisting of amplitude values for each subcarrier, each packet, each transmit antenna, and each receive antenna (amplitude value vector) (i.e., each amplitude value represents an amplitude value for a wireless signal in a specific subcarrier and a specific packet received from a specific antenna to a specific receive antenna), and a second vector consisting of phase values for each subcarrier, each packet, each transmit antenna, and each receive antenna (phase value vector) (i.e., each phase value represents a phase value for a wireless signal in a specific subcarrier and a specific packet received from a specific antenna to a specific receive antenna). In addition, the first vector (amplitude value vector) and the second vector (phase value vector) can be converted into a feature map by combining/merging them.

Figure 2:
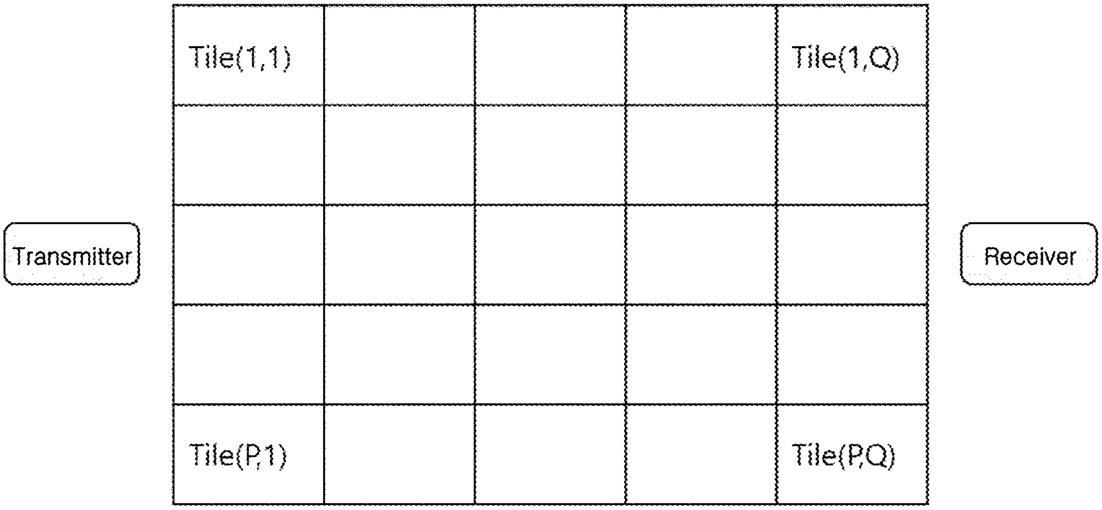
FIG. 2 illustrates a tile map according to one embodiment of the present invention.

FIG. 2 illustrates a tile map according to one embodiment of the present invention.

Referring to FIG. 2, the fire occurrence detection system according to the present invention collects channel state information values in a situation where a forest fire has occurred and channel state information values in a normal situation where a forest fire has not occurred, respectively, in order to detect a forest fire. In addition, the fire occurrence detection system forms/configures a tile map between the transmitter and the receiver as shown in FIG. 2, and records/stores in which tile coordinate of the tile map the forest fire occurred when a forest fire occurred.

In addition, the fire occurrence detection system maps coordinates of a fire occurrence (and no fire occurrence) on the tile map into classes. Here, the presence or absence of a forest fire and the location of the forest fire can be mapped to the following classes: For example, if no forest fire occurs, it can be mapped to class 0, if a forest fire occurs at tile coordinates (1,1), it can be mapped to class 1, if a forest fire occurs at tile coordinates (1,0), it can be mapped to class 1+Q, if a forest fire occurs at tile coordinates (P,1), it can be mapped to class 1+Q×(P−1), and if a forest fire occurs at tile coordinates (P,Q), it can be mapped to class 1+Q×P.

Here, the shape of the tile map can be determined by considering the distance between the transmitter and receiver combination used to detect the occurrence of a fire, the altitude difference between the transmitter and the receiver, and the object located between the transmitter and the receiver. For example, since the transmitter and receiver combination used for detecting a forest fire can be located at a relatively long distance, a tile map with a very long height can be formed.

The fire occurrence detection system can learn an AI model using feature maps (see FIG. 1) generated from channel state information and corresponding class values (see FIG. 2). For example, the fire occurrence detection system can learn a classification neural network based on a convolutional neural network (CNN). In other words, one or more values of the feature map and/or changes in one or more values of the feature map and the relationship between the class values can be determined through learning the AI model.

In this case, a learned AI model (e.g., a classification neural network) can be used to infer class values from a newly given feature map, analyze the class values, and detect a forest fire and find out the approximate location of the detected forest fire. In other words, when a fire detection system receives a wireless signal, it converts the wireless signal into a feature map (i.e., a matrix consisting of phase values and amplitude values), infers a class value from the new input value (i.e., the feature map) for a learned AI model (e.g., a classification neural network), and derives the coordinates of the type map from the inferred class value to determine the location of the fire.

Here, in order to reduce false detection in AI model training (i.e., machine learning) for wildfire detection, it is necessary to collect various training data. For example, data can be collected at dawn, morning, noon, dusk, evening, and midnight depending on the time. Data can be collected in spring, summer, fall, and winter depending on the season. Data can be collected in situations such as when it rains, snows, is sunny, or is foggy depending on the weather. Depending on the altitude, data can be collected from places such as mountain peaks, mountain slopes, mountain slopes, and valleys.

For example, the present invention can provide a method for detecting forest fires in mountainous terrain using a fire detection utilizes the channel state information value of a wireless signal based on machine learning.

Figure 3:
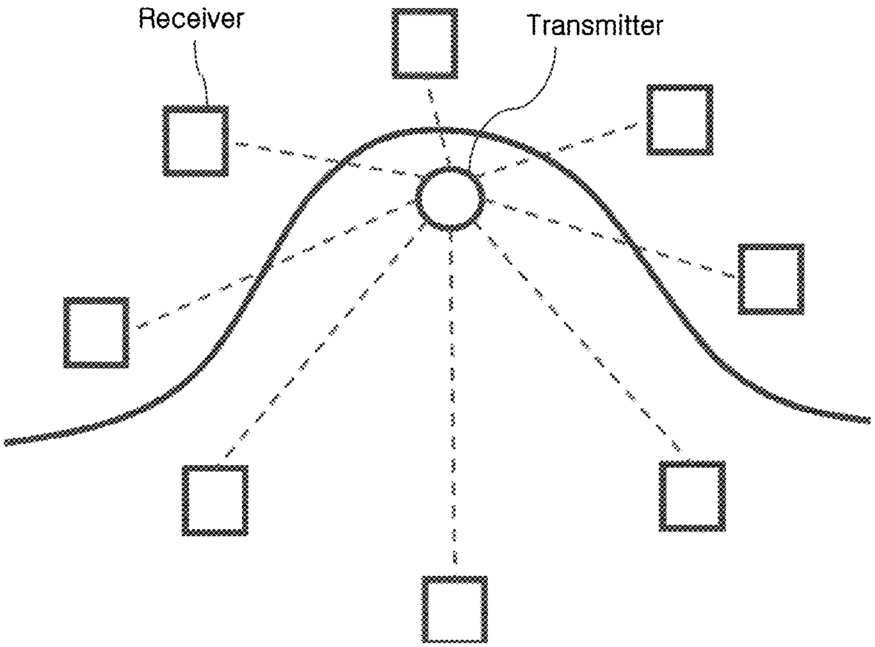
FIG. 3 and FIG. 4 are diagrams illustrating arrangement forms of a transmitter and a receiver according to one embodiment of the present invention.
Figure 4:
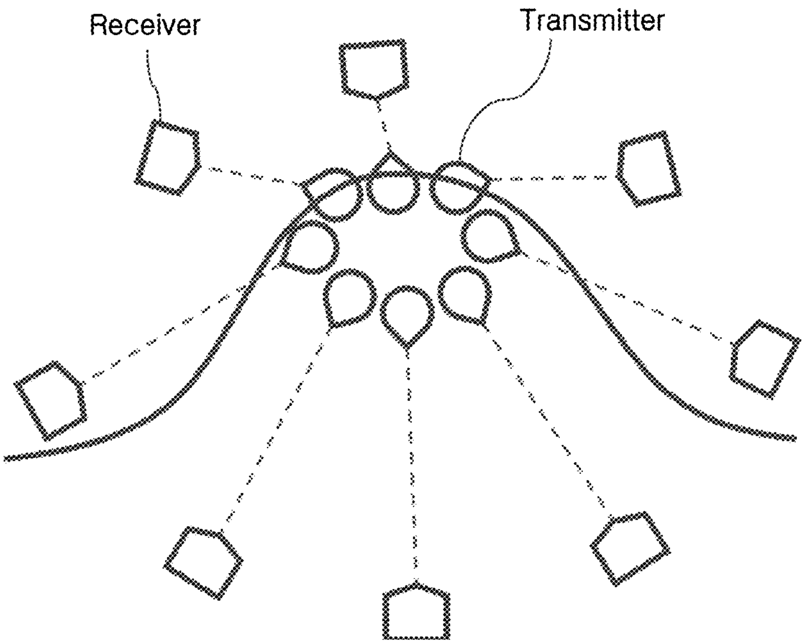

FIG. 3 and FIG. 4 are diagrams illustrating arrangement forms of a transmitter and a receiver according to one embodiment of the present invention.

In the case of wireless LAN signals, the transmission distance is generally only tens of meters (m), but it can reach several kilometers (km) when a long-distance transmission-only antenna is used.

In order to perform forest fire detection in the entire mountainous area, it is necessary to place and configure a minimum number of wireless LAN transmitters and receivers. As shown in FIG. 3, one transmitter and an omnidirectional long-distance transmitting antenna can be placed on a mountain peak, and receivers and long-distance receiving antennas can be placed in a radial shape at the foot of the mountain. Here, the arrangement interval between the receivers can be determined in consideration of the relative distance between the transmitter and the receiver. For example, if the distance between the transmitter and the receiver is short, the interval between the receivers can be placed wide, and if the distance is long, the interval can be placed narrow. Additionally, it may be composed of a set of transmitters and a set of receivers using directional antennas, as shown in FIG. 4.

Figure 5:
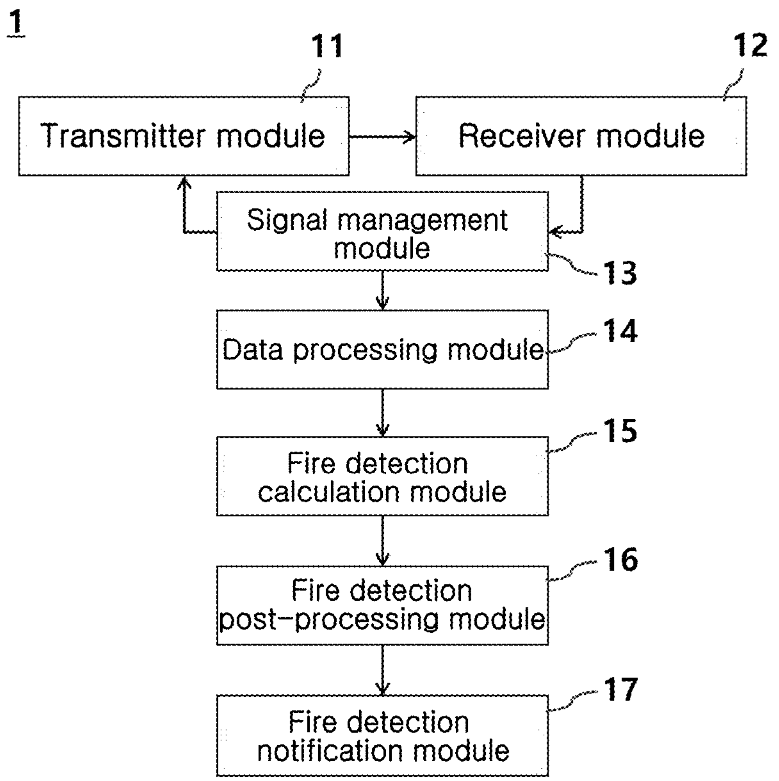
FIG. 5 illustrates a fire occurrence detection system according to one embodiment of the present invention.

FIG. 5 illustrates a fire occurrence detection system according to one embodiment of the present invention.

Referring to FIG. 5, a fire occurrence detection system (1) (i.e., a system for performing forest fire detection for the entire mountainous area) may be configured to include a transmitter module (11), a receiver module (12), a signal management module (13), a data processing module (14), a fire detection calculation module (15), a fire detection post-processing module (16), and a fire detection notification module (17).

The transmitter module (11) periodically transmits a wireless signal (e.g., a wireless LAN signal) through a transmission antenna according to a request from the signal management module.

The receiver module (12) receives a wireless signal (e.g., a wireless LAN signal) through a receiving antenna and transmits the result to the signal management module.

The signal management module (13) is connected to both the transmitter module (11) and the receiver module (12) to manage periodic wireless signal transmission and reception and process the received wireless signal. The signal management module (13) can transmit internal processing and processing results for an emergency situation, such as when a wireless signal is not transmitted to the receiver module (12) within a predetermined time period, to an external system (e.g., an administrator) in relation to signal management. In addition, the signal management module (13) receives for a predetermined time period in relation to signal processing and transmits continuous channel state information data to the data processing module (14).

The data processing module (14) separates the channel state information data transmitted from the signal management module (13) into amplitude data and phase data, performs noise removal, and transmits it to the fire detection calculation module (15).

The fire detection calculation module (15) calculates a fire detection result for the transmitted continuous amplitude and phase data and transmits it to the fire detection post-processing module (16).

The fire detection notification module (17) notifies (or outputs a notification) information such as the transmitted occurrence time and occurrence location to an external system (e.g., an administrator) in a pre-designated manner.

Figure 6:
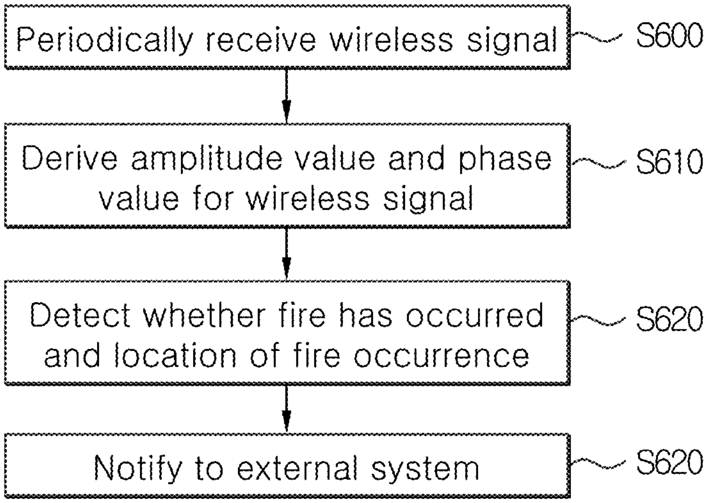
FIG. 6 illustrates a method for detecting a fire occurrence according to one embodiment of the present invention.

FIG. 6 illustrates a method for detecting a fire occurrence according to one embodiment of the present invention.

Referring to FIG. 6, a first device (e.g., a device composed of one or more modules in the fire occurrence detection system (1) of FIG. 5) periodically receives a wireless signal from a second device (S601).

Here, the wireless signal may correspond to a wireless LAN signal, a cellular signal, etc.

The first device derives an amplitude value and a phase value for the wireless signal from the wireless signal (S602).

The first device performs inference of an artificial intelligence model using the amplitude value and the phase value as input data to detect whether a fire has occurred and the location of the fire occurrence (S603).

Here, the first device can generate a plurality of feature maps for a plurality of wireless signals in the time domain transmitted from the transmitter. More specifically, the first device can generate each feature map for the plurality of feature maps by combining an amplitude value vector composed of subcarrier-specific and packet-specific amplitude values of each wireless signal for the plurality of wireless signals and a phase value vector composed of subcarrier-specific and packet-specific phase values of each wireless signal for the plurality of wireless signals. In addition, the first device can detect whether a fire has occurred and the location of the fire based on the feature maps.

In addition, the first device can generate a multidimensional tile map composed of tiles having a predetermined size for each dimension between the second device and the first device. In this case, a specific location where the fire occurred can be determined based on the coordinates of the tiles.

In addition, the first device learns the artificial intelligence model using the plurality of feature maps and the multidimensional tile map, and performs inference of the artificial intelligence model using a newly received wireless signal as an input value, thereby detecting whether a fire has occurred and the location of the fire.

In addition, when there are overlapping tiles in the plurality of multidimensional type maps for the plurality of second devices, the first device can detect whether a fire has occurred in the overlapping type based on all of the inferences of the artificial intelligence model corresponding to the plurality of multidimensional tile maps.

If a fire is detected at a specific location, the first device notifies (or outputs a notification) to an external system (S604).

Here, the first device can notify (or output a notification) to the external system if a fire is detected to have occurred for a predetermined period of time or more and/or a fire is detected to have occurred at a specific location a predetermined number of times or more.

Figure 7:
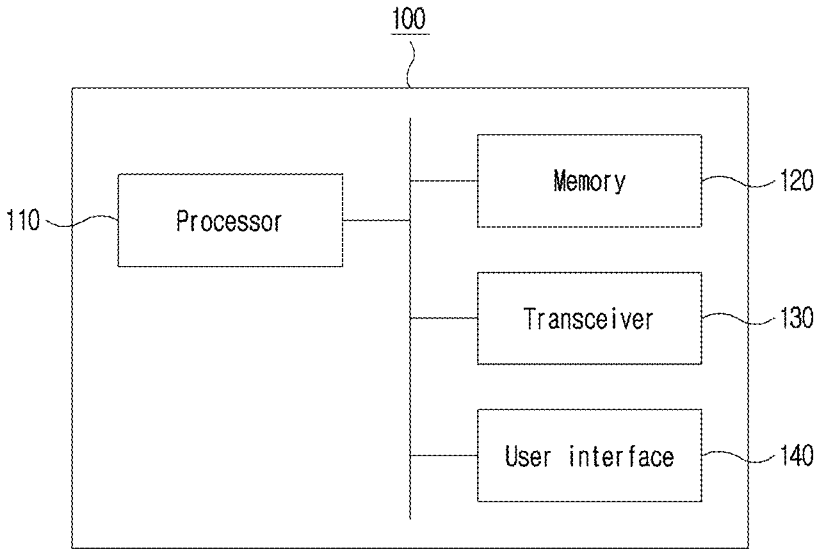
FIG. 7 is a block diagram of a device for detecting a fire occurrence according to an embodiment of the present invention.

FIG. 7 is a block diagram of a device for detecting a fire occurrence according to an embodiment of the present invention.

A device (100) for detecting a fire occurrence (hereinafter, referred to as a first device, the first device corresponds to a device composed of one or more modules in the fire occurrence detection system (1) of FIG. 5) may include one or more processors (110), one or more memories (120), one or more transceivers (130), one or more user interfaces (140), etc. The memory (120) may be included in the processor (110) or may be configured separately. The memory (120) may store instructions that cause the device (100) to perform operations when executed by the processor (110). The transceiver (130) may transmit and/or receive signals, data, etc. that the device (100) exchanges with other entities. The user interface (140) may receive a user's input for the device (100) or provide an output of the device (100) to the user. Among the components of the device (100), components other than the processor (110) and the memory (120) may not be included in some cases, and other components not shown in FIG. 7 may be included in the device (100).

The processor (110) may be configured to cause the above-described device (100) to perform the methods according to various examples of the present disclosure. Although not illustrated in FIG. 7, the processor (110) may also be configured as a set of modules that perform each method/function proposed in the present disclosure. For example, the processor (110) may include or be physically implemented with analog and/or digital circuits including one or more of a logic gate, an integrated circuit, a microprocessor, a microcontroller, a memory circuit, a passive electronic component, an active electronic component, an electronic component, an optical component, etc., and may be configured to execute software and/or firmware to perform the functions or operations described in the present disclosure. The transceiver (130) may include any one or a combination of a digital modem, an RF (Radio Frequency) modem, an antenna circuit, a WiFi chip, and may be configured to execute software and/or firmware to perform the functions or operations described in the present disclosure without limitation. The user interface (140) may include, but is not limited to, at least one of a computer keyboard, a mouse, a touch or touchless sensor, a microphone, a display, and a speaker.

The processor (110) periodically receives a wireless signal from a second device.

Here, the wireless signal may correspond to a wireless LAN signal, a cellular signal, etc.

In addition, the processor (110) derives an amplitude value and a phase value for the wireless signal from the wireless signal.

In addition, the processor (110) performs inference of an artificial intelligence model using the amplitude value and the phase value as input data to detect whether a fire has occurred and the location of the fire.

Here, the processor (110) can generate a plurality of feature maps for a plurality of wireless signals in the time domain transmitted from the transmitter. More specifically, the processor (110) can generate each feature map for the plurality of feature maps by combining an amplitude value vector composed of subcarrier-specific and packet-specific amplitude values of each wireless signal for the plurality of wireless signals and a phase value vector composed of subcarrier-specific and packet-specific phase values of each wireless signal for the plurality of wireless signals. Then, the first device can detect whether a fire has occurred and the location of the fire based on the feature maps.

Additionally, the processor (110) can generate a multidimensional tile map composed of tiles having a predetermined size for each dimension between the second device and the first device. In this case, a specific location where the fire occurred can be determined based on the coordinates of the tiles.

In addition, the processor (110) learns the artificial intelligence model using the plurality of feature maps and the multidimensional tile map, and performs inference of the artificial intelligence model using a newly received wireless signal as an input value, thereby detecting whether a fire has occurred and the location of the fire.

In addition, when there are overlapping tiles in the plurality of multidimensional type maps for the plurality of second devices, the processor (110) can detect whether a fire has occurred in the overlapping type based on all of the inferences of the artificial intelligence model corresponding to the plurality of multidimensional tile maps.

In addition, if the processor (110) detects that a fire has occurred at a specific location, the first device notifies (or outputs a notification) to an external system.

Here, if the processor (110) detects that a fire has occurred for a predetermined period of time or more and/or detects that a fire has occurred at a specific location for a predetermined number of times or more, the processor (110) can notify (or output a notification) to the external system.

Components described in exemplary embodiments of the present disclosure may be implemented by hardware elements. For example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in exemplary embodiments may be implemented in a combination of hardware and software.

The method according to an embodiment of the present disclosure may be implemented as a program that can be executed by a computer, and the computer program may be recorded in various recording media such as magnetic storage media, optical read media, and digital storage media.

The various technologies described in this disclosure may be implemented as digital electronic circuits or computer hardware, firmware, software, or a combination thereof. The above technologies may be implemented as a computer program product, that is, a computer program tangibly embodied in an information medium (e.g., a machine-readable storage device (e.g., a computer-readable medium) or a data processing device) or a computer program implemented as signals processed by or propagated by a data processing device to cause the operation of the data processing device (e.g., programmable processor, computer, or multiple computers).

Computer program(s) may be written in any form of programming language, including compiled or interpreted languages and may be distributed as a stand-alone program or in any form, including modules, components, subroutines, or other units suitable for use in a computing environment. A computer program may be executed by a single computer or by multiple computers distributed at one site or multiple sites and interconnected by a communications network.

Examples of processors suitable for executing computer programs include general-purpose and special-purpose microprocessors, and one or more processors in digital computers. Typically, a processor receives instructions and data from read-only memory, random access memory, or both. Components of a computer may include at least one processor for executing instructions and one or more memory devices for storing instructions and data. Additionally, the computer may include one or more mass storage devices for data storage, such as magnetic, magneto-optical disks, or optical disks, or may be connected to the mass storage devices to receive and/or transmit data. Examples of information media suitable for implementing computer program instructions and data include optical media such as semiconductor memory devices (e.g., magnetic media such as hard disks, floppy disks, and magnetic tapes), compact disk read-only memory (CD-ROM), digital video disk (DVD), etc., magneto-optical media such as floptical disks, and read only memory (ROM), random access memory (RAM), flash memory, erasable programmable ROM (EPROM), electrically erasable programmable ROM (EEPROM), and other known computer-readable media. Processors and memories can be supplemented or integrated by special-purpose logic circuits.

A processor may run an operating system (OS) and one or more software applications that run on the OS. The processor device may also access, store, manipulate, process and generate data in response to software execution. For simplicity, the processor device is described in the singular, but those skilled in the art will understand that the processor device may include a plurality of processing elements and/or various types of processing elements. For example, a processor device may include a plurality of processors or a processor and a controller. Additionally, different processing structures, such as parallel processors, may be configured. Additionally, computer-readable media refers to all media that a computer can access, and may include both computer storage media and transmission media.

Although this disclosure includes detailed descriptions of various detailed implementation examples, the details should not be construed as limiting the invention or scope of the claims proposed in this disclosure, but rather illustrating features of specific exemplary embodiments.

Features individually described in exemplary embodiments in this disclosure may be implemented by a single exemplary embodiment. Conversely, various features described in this disclosure with respect to a single exemplary embodiment may be implemented by a combination or appropriate sub-combination of a plurality of exemplary embodiments. Furthermore, in the present disclosure, the features may operate by a specific combination, and the combination may initially be described as claimed, however, in some cases, one or more features may be excluded from the claimed combination, or claimed combinations may be modified in the form of sub-combinations or modifications of sub-combinations.

Similarly, even if operations are depicted in a specific order in the drawings, it should not be understood that execution of the operations in a specific order or sequence is necessary, or that performance of all operations is required to obtain a desired result. In certain cases, multitasking and parallel processing can be useful. Additionally, it should not be understood that the various device components in all exemplary embodiments are necessarily separate, and the above-described program components and devices may be packaged in a single software product or multiple software products.

The exemplary embodiments disclosed herein are illustrative only and are not intended to limit the scope of the disclosure. Those skilled in the art will recognize that various modifications may be made to the exemplary embodiments without departing from the scope of the claims and their equivalents.

Accordingly, this disclosure is intended to include all other substitutions, modifications and changes that fall within the scope of the following claims.

What is claimed is:

1. A method for detecting occurrence of a fire, the method being performed by a first device, comprising:

periodically receiving a wireless local area network (WLAN) signal or a cellular signal as a wireless signal from a second device, wherein the wireless signal comprises channel state information (CSI) derived from a plurality of subcarriers;

deriving an amplitude value and a phase value for the second device from the wireless signal by (i) converting individual channel state information h for each subcarrier $H_i$ with h=a+bi, where a and b are real orthogonal coordinates, from an orthogonal coordinate form to a polar coordinate form to obtain the amplitude value $r=\sqrt{a^2+b^2}$ and the phase value θ=arctan(b/a), and (ii) applying wavelet-domain denoising and linear-phase-fitting correction to remove noise and timing-offset phase error from the derived amplitude value and phase value;

detecting whether the fire has occurred and a location of the fire by performing inference of a convolutional neural network (CNN)-based artificial intelligence model using a feature map generated by combining an amplitude value vector and a phase value vector as input data; and notifying an external system when it is detected that the fire has occurred at a specific location.

2. The method of claim 1, wherein a plurality of feature maps are generated for a plurality of wireless signals comprising the wireless signal in a time domain transmitted from the second device, wherein each feature map of the plurality of feature maps is generated by combining the amplitude value vector composed of subcarrier-specific amplitude values and packet-specific amplitude values of each wireless signal of the plurality of wireless signals and the phase value vector composed of subcarrier-specific phase values and packet-specific phase values of said each wireless signal of the plurality of wireless signals, and wherein whether the fire has occurred and the location of the fire are detected based on the feature maps.

3. The method of claim 2, wherein a multidimensional tile map composed of tiles having a predetermined size for each dimension of a plurality of dimensions is generated between the second device and the first device, and wherein the specific location where the fire has occurred is determined based on coordinates of the tiles.

4. The method of claim 3, wherein the CNN-based artificial intelligence model is learned using the plurality of feature maps and the multidimensional tile map.

5. The method of claim 4, wherein when there is an overlapping tile in multiple multidimensional tile maps for multiple second devices, whether the fire has occurred in the overlapping tile is detected based on all of one or more inferences of one or more artificial intelligence models corresponding to the multiple multidimensional tile maps.

6. The method of claim 1, wherein when it is detected that the fire has occurred for a predetermined period of time or more and/or when it is detected that the fire has occurred at the specific location for a predetermined number of times or more, it is notified to the external system.

7. A first device for detecting occurrence of a fire, the first device comprising:

at least one processor; and at least one memory operably connected to the at least one processor and storing instructions that, when executed by the at least one processor, cause the first device to perform operations comprising:

periodically receiving a wireless local area network (WLAN) signal or a cellular signal as a wireless signal from a second device, wherein the wireless signal comprises channel state information (CSI) derived from a plurality of subcarriers;

deriving an amplitude value and a phase value for the second device from the wireless signal by (i) converting individual channel state information h for each subcarrier $H_i$ with h=a+bi, where a and b are real orthogonal coordinates, from an orthogonal coordinate form to a polar coordinate form to obtain the amplitude value $r=\sqrt{a^2+b^2}$ and the phase value θ=arctan(b/a), and (ii) applying wavelet-domain denoising and linear-phase-fitting correction to remove noise and timing-offset phase error from the derived amplitude value and phase value;

detecting whether the fire has occurred and a location of the fire by performing inference of a convolutional neural network (CNN)-based artificial intelligence model using-the-a feature map generated by combining an amplitude value vector and a phase value vector as input data; and notifying an external system when it is detected that the fire has occurred at a specific location.

8. The first device of claim 7, wherein a plurality of feature maps are generated for a plurality of wireless signals comprising the wireless signal in a time domain transmitted from the second device, wherein each feature map of the plurality of feature maps is generated by combining the amplitude value vector composed of subcarrier-specific amplitude values and packet-specific amplitude values of each wireless signal of the plurality of wireless signals and the phase value vector composed of subcarrier-specific phase values and packet-specific phase values of said each wireless signal of the plurality of wireless signals, and wherein whether the fire has occurred and the location of the fire are detected based on the feature maps.

9. The first device of claim 8, wherein a multidimensional tile map composed of tiles having a predetermined size for each dimension of a plurality of dimensions is generated between the second device and the first device, and wherein the specific location where the fire has occurred is determined based on coordinates of the tiles.

10. The first device of claim 9, wherein the CNN-based artificial intelligence model is learned using the plurality of feature maps and the multidimensional tile map.

11. The first device of claim 10, wherein when there is an overlapping tile in multiple multidimensional tile maps for multiple second devices, whether the fire has occurred in the overlapping tile is detected based on all of one or more inferences of one or more artificial intelligence models corresponding to the multiple multidimensional tile maps.

12. The first device of claim 7, wherein when it is detected that the fire has occurred for a predetermined period of time or more and/or when it is detected that the fire has occurred at the specific location for a predetermined number of times or more, it is notified to the external system.

13. At least one non-transitory computer-readable medium storing at least one instruction, wherein the at least one instruction executable by at least one processor controls a first device for detecting occurrence of a fire to:

periodically receive a wireless local area network (WLAN) signal or a cellular signal as a wireless signal from a second device, wherein the wireless signal comprises channel state information (CSI) derived from a plurality of subcarriers;

derive an amplitude value and a phase value for the second device from the wireless signal by (i) converting individual channel state information h for each subcarrier $H_i$ with h=a+bi, where a and b are real orthogonal coordinates, from an orthogonal coordinate form to a polar coordinate form to obtain the amplitude value $r=\sqrt{a^2+b^2}$ and the phase value $\theta=\arctan(b/a)$, and (ii) applying wavelet-domain denoising and linear-phase-fitting correction to remove noise and timing-offset phase error from the derived amplitude value and phase value;

detect whether the fire has occurred and a location of the fire by performing inference of a convolutional neural network (CNN)-based artificial intelligence model using a feature map generated by combining an amplitude value vector and a phase value vector as input data; and notify an external system when it is detected that the fire has occurred at a specific location.

* * * * *